(12) United States Patent
Shimizu et al.

(10) Patent No.: US 6,843,342 B2
(45) Date of Patent: Jan. 18, 2005

(54) POWER STEERING SYSTEM

(75) Inventors: Noboru Shimizu, Tokyo (JP); Tsunofumi Arita, Gifu (JP); Naoto Shima, Aichi (JP); Masashi Takai, Seki (JP)

(73) Assignee: Kayaba Industry Co., Ltd., Tokyo (JP)

( * ) Notice: Subject to any disclaimer, the term of this patent is extended or adjusted under 35 U.S.C. 154(b) by 0 days.

(21) Appl. No.: 10/350,351

(22) Filed: Jan. 23, 2003

(65) Prior Publication Data

US 2003/0141139 A1 Jul. 31, 2003

(30) Foreign Application Priority Data

Jan. 25, 2002 (JP) ........................................ 2002-016503

(51) Int. Cl.[7] .............................................. B62D 5/06
(52) U.S. Cl. ........................ 180/422; 180/421; 701/42
(58) Field of Search ................................. 180/421–423; 701/41, 42

(56) References Cited

U.S. PATENT DOCUMENTS 6,173,223 B1 * 1/2001 Liubakka et al. ............. 701/42
6,484,081 B1 * 11/2002 Nakashima ................... 701/41
6,484,841 B2 * 11/2002 Takai et al. ................... 180/422
6,499,557 B2 * 12/2002 Takai et al. ................... 180/422

* cited by examiner

Primary Examiner—Lesley D. Morris
Assistant Examiner—L. Lum
(74) Attorney, Agent, or Firm—Steinberg & Raskin, P.C.

(57) ABSTRACT

Provision of a power steering system capable of giving a driver no discomfort during high-speed travel. A controller calculates or stores a current instruction value I1 in accordance with a steering angle supplied from a steering angle sensor and a current instruction value I2 in accordance with a steering angular velocity; performs multiplication of the steering angle base current instruction value I1 and the steering angular velocity base current instruction value I2 by current instruction values I5, I6 set based on a vehicle speed, respectively; applies current instruction values I7, I8 in accordance with the vehicle speed serving as limit values to the corresponding steering angle base and steering angular velocity base current instruction values resulting from the multiplication; selects a larger value of the two current instruction values below the limit values; and determines the selected value as a solenoid current instruction value SI.

16 Claims, 5 Drawing Sheets

POWER STEERING SYSTEM

BACKGROUND OF THE INVENTION

1. Field of the Invention

This invention relates to a power steering system including a flow control valve for the prevention of energy loss.

2. Description of Related Art

An example of power steering systems including a flow control valve for the prevention of energy loss is disclosed in Laid-open Japanese Patent Application No. 2001-260917 filed by the present applicant.

As shown in FIG. 4, the flow control valve V of the power steering system of the prior art example includes a spool 1 having an end adjoining a pilot chamber 2 and the other end adjoining another pilot chamber 3.

The pilot chamber 2 continuously communicates with a pump P via a pump port 4. Further, the pilot chamber 2 communicates via a flow path 6, a variable orifice a and a flow path 7 with an inflow port of a steering valve 9 provided for controlling a power cylinder 8.

The pilot chamber 3 incorporates a spring 5 and also communicates with the inflow port of the steering valve 9 via a flow path 10 and the flow path 7. Accordingly, the pilot chambers 2 and 3 communicate with each other via the variable orifice a, the flow path 7 and the flow path 10. Pressure upstream from the variable orifice a acts on the pilot chamber 2, and pressure downstream therefrom acts on the pilot chamber 3. The degree of opening of the variable orifice a is controlled by a solenoid current instruction value S1 for a solenoid SOL.

The spool 1 keeps a position at which the force acting on the pilot chamber 2, the force acting on the pilot chamber 3, and the force of the spring 5 are in balance. This balanced position determines the degree of opening of both the pump port 4 and tank port 11.

For example, upon actuation of a pump driving source 12 such as an engine or the like, the pump P is driven to supply pressure oil to the pump port 4 to cause a flow in the variable orifice a. This flow produces a pressure difference between the two sides of the variable orifice a, and the pressure difference causes a difference in pressure between the pilot chambers 2 and 3. The resultant differential pressure moves the spool 1 from the normal position, illustrated in FIG. 3, to the balanced position with opposing a force of the spring 5.

Thus, moving the spool 1 from the normal position toward the balanced position increases the degree of opening of the tank port 11. In accordance with the resultant degree of opening of the tank port 11, the distribution ratio between a control flow QP introduced toward the steering valve 9 from the pump P and a return flow QT circulating back to the tank T or the pump P is determined. In other words, the control flow QP is determined in accordance with the degree of opening of the tank port 11.

The control of the control flow QP in accordance with the degree of opening of the tank port 11 as described above results in determination of the control flow QP in accordance with the degree of opening of the variable orifice a. This is because the position to which the spool 1 is shifted and which determines the degree of opening of the tank port 11, is determined by the differential pressure between the two pilot chambers 2 and 3, and this differential pressure is determined by the degree of opening of the variable orifice a.

Thus, in order to control the control flow QP in accordance with vehicle speeds or steering conditions of the vehicle, the degree of opening of the variable orifice a, or the solenoid current instruction value SI for the solenoid SOL may be controlled. This is because the degree of the variable orifice a is controlled in proportion to an excitation current of the solenoid SOL so that the variable orifice a holds the degree of its opening to a minimum in a non-excited state of the solenoid SOL and increases the degree of its opening as the excitation current is increased.

The steering valve 9 applied with the control flow QP controls the amount of oil supplied to the power cylinder 8 in accordance with input torque (steering torque) of the steering wheel (not shown). For example, if the steering torque is large, the amount of shifting of the steering valve 9 is increased to increase the amount of oil supplied to the power cylinder 8, whereas if it is small, the amount of shifting of the steering valve 9 is decreased to decrease the amount of oil supplied to the power cylinder 8. The higher amount the pressure oil is supplied, the higher assist force the power cylinder 8 exerts, and the smaller amount the pressure oil is supplied, the lower assist force the power cylinder 8 exerts.

It should be noted that the steering torque and the amount of shifting of the steering valve 9 are determined by a torsion reaction of a torsion bar (not shown) or the like.

As described above, the steering valve 9 controls a flow QM supplied to the power cylinder 8 and the flow control valve V controls the control flow QP supplied to the steering valve 9. If the flow QM required by the power cylinder 8 comes as close as possible to the control flow QP determined by the flow control valve V, it is possible to reduce the energy loss around the pump P. This is because the energy loss around the pump P is caused by a difference between the control flow QP and the flow QM required by the power cylinder 8.

In order to make the control flow QP as close as possible to the flow QM required by the power cylinder 8 for the prevention of energy loss, the system of the prior art example controls the degree of opening of the variable orifice a. The degree of opening of the variable orifice a is determined by the solenoid current instruction value SI for the solenoid SOL as described earlier. A controller C, described below in detail, controls the solenoid current instruction value SI.

The controller C is connected to a steering angle sensor 14 and a vehicle speed sensor 15. As illustrated in FIG. 5, the controller C determines a current instruction value I1 based on a steering angle detected by the steering angle sensor 14, and also a current instruction value I2 based on a steering angular velocity calculated by differentiating the steering angle.

The relationship between the steering angle and the current instruction value I1 is determined on the basis of theoretical values giving linear characteristics to the relationship between the steering angle and the control flow QP. The relationship between the steering angular velocity and the current instruction value I2 is also determined on the basis of the theoretical values giving linear characteristics to the relationship between the steering angular velocity and the control flow QP. Both of the current instruction values I1 and I2 are outputted at zero unless the steering angle and the steering angular velocity exceed a set value. Specifically, when the steering wheel is positioned at or around the center, the current instruction values I1 and I2 are outputted at zero in order to set a dead zone around the center.

Further, the controller C outputs a steering angle-dedicated current instruction value I3 and a steering angular velocity-dedicated current instruction value I4 on the basis of a detected value provided by the vehicle speed sensor 15.

The steering angle-dedicated current instruction value I3 is outputted at 1 at low vehicle speeds and, for example, at 0.6 at highest vehicle speeds. In addition, the steering angular velocity-dedicated current instruction value I4 is outputted at 1 at low vehicle speeds and, for example, at 0.8 at highest vehicle speeds. In other words, in from low vehicle speeds to highest vehicle speeds, a gain for the steering angle-dedicated current instruction value I3 controlled in the range of 1 to 0.6 is set to be larger than that for the steering angular velocity-dedicated current instruction value I4 controlled in the range of 1 to 0.8.

The steering angle-dedicated current instruction value I3 is then multiplied by the current instruction value I1 based on the steering angle. Because of this, the steering angle-based current instruction value I5 resulting from this multiplication becomes smaller as the vehicle speed increases. In addition, the gain for the steering angle-dedicated current instruction value I3 is set to be larger than that set for the steering angular velocity-dedicated current instruction value I4. Therefore, the faster the vehicle speed becomes, the higher the rate of decrease of the value I5 becomes. That is to say, the response is kept high at low vehicle speeds and is reduced at high vehicle speeds. The reason for changing in speed of the response in accordance with the vehicle speeds is that the high response is not usually required during high-speed travel but is necessary, in most of the cases, at low vehicle speeds.

The controller C provides the current instruction value I2 based on the steering angular velocity with the steering angular velocity current instruction value I4 as a limit value and outputs a steering angular velocity-based current instruction value I6. This current instruction value I6 is also reduced in accordance with the vehicle speeds. However, the gain for the steering angular velocity-dedicated current instruction value I4 is set to be smaller than that set for the steering angle-dedicated current instruction value I3. Therefore, the reducing rate for the current instruction value I6 is smaller than that for the current instruction value I5.

The reason for setting the limit values in accordance with vehicle speeds is mainly for the prevention of an excessive assist force from exerting during high-speed travel.

The steering angle-based current instruction value I5 and the steering angular velocity-based current instruction value I6 outputted as described above are compared and the larger value of the two is adopted.

For example, the steering wheel is rarely rotated abruptly during high-speed travel, and therefore it is common that a steering angle-based current instruction value I5 is larger than a steering angular velocity-based current instruction value I6. Because of this, in most cases, the steering angle-based current instruction value I5 is selected during high-speed travel. In order to enhance the safety and stability of handling the steering wheel at this time, the gain for the current instruction value I5 is set to be larger. In other words, as the travelling speed becomes faster, the proportion for making the control flow QP small becomes larger for enhancement of the safety and stability during travel.

On the other hand, the steering wheel is often rotated abruptly during travel at low vehicle speeds, so that, in many cases, the value of the steering angular velocity becomes larger than that of the steering angle. Because of this, during low-speed travel, the steering angular velocity-based current instruction value I6 is selected in most cases. When the steering angular velocity is larger, the response is regarded to be of importance.

Accordingly, during travel at low vehicle speeds, the gain for the steering angular velocity-based current instruction value I6 maintains small with reference to the steering angular velocity in order to enhance the response, that is, the handling of the steering wheel. In other words, when the traveling speed becomes faster for some extent, even if the steering wheel is abruptly rotated, the response is secured by means of obtaining adequate control flow QP.

The current instruction value I5 or I6 selected as described above is added to a standby current instruction value I7. The resultant value of the addition of the standby current instruction value I7 is outputted to a driver 16 as a solenoid current instruction value SI.

Due to the addition of the standby current instruction value I7, the solenoid current instruction value SI is kept to be the predetermined magnitude even when all the current instruction values based on the steering angles, the steering angular velocities and the vehicle speeds are at zero. For this reason, a predetermined oil flow is supplied to the steering valve 9 at all times. In view of the prevention of energy loss, it is ideal for the control flow QP in the flow control valve V to be zero when the flow QM required by the power cylinder 8 and the steering valve 9 is zero. In other words, reducing the control flow QP to zero means causing the total amount of oil discharged from the pump P to return back to the pump P or the tank T from the tank port 11. The path of oil flow returning from the tank port 11 to the pump P or the tank T is extremely short in the main body B, so that little pressure loss occurs. Due to little pressure loss, driving torque of the pump P is lessened to a minimum, resulting in energy conservation. In this context, with regard to the prevention of energy loss, it is advantageous for the control flow QP to be zero when the required flow QM is zero.

Nevertheless, a standby flow QS is maintained even when the required flow QM is zero. This is because of the following.

(1) To prevent seizure in the system. The circulation of the standby flow QS through the system can provide cooling effects.

(2) To ensure response. The maintenance of the standby flow QS as described above results in a reduction of the time required for attaining a target control flow QP as compared with the case of no maintenance of the standby flow QS. The resultant time difference affects the response. As a result, the maintenance of the standby flow QS leads to improvement in the response.

(3) To counter disturbances, such as kickback and the like, and self-aligning torque. When reaction to disturbance or self-aligning torque acts on the wheels, the reaction acts on the rod of the power cylinder 8. If the standby flow is not maintained, the reaction to the disturbance or self-aligning torque makes the wheels unsteady. However, the maintenance of the standby flow prevents the wheels from becoming unsteady even when the reaction as described above acts on the wheels. Specifically, the rod of the power cylinder 8 engages with a pinion and the like for switching the steering valve 9. Hence, upon the action of the reaction, the steering valve is also switched to supply the standby flow in a direction counter to the reaction. Therefore, maintaining the standby flow makes it possible to counter the self-aligning torque and the disturbance caused by kickback.

Next, a description will be given of the operation of the power steering system of the prior art example.

During travel of a vehicle, the controller C outputs a steering angle-based current instruction value I5 which is the resultant value of multiplication of a solenoid current instruction value I1 based on a steering angle by a steering angle-dedicated current instruction value I3, and also outputs a steering angular velocity-based current instruction value I6. The current instruction value I6 is determined by a solenoid current instruction value I2, based on the steering angular velocity, that is limited by a steering angular velocity-dedicated current instruction value I4 serving as a limit value.

Next, the steering angle-based current instruction value I5 and the steering angular velocity-based current instruction value I6 are compared with each other and the larger value of the two current instruction value I5, I6 is added to a standby current instruction value I7 to determine a solenoid current instruction value SI at this point. The solenoid current instruction value SI is provided mainly in reference to the steering angle base current instruction value I5 during high-speed travel of the vehicle and to the steering angular velocity base current instruction value I6 during low-speed travel of the vehicle.

It should be noted that the spool 1 has a slit 13 formed on its leading end. The slit 13 allows the pilot chamber 2 to communicate with the variable orifice a even when the spool 1 is at the normal position as illustrated in FIG. 4. Specifically, even when the spool 1 is in the normal position, the pressure oil having supplied from the pump port 4 to the pilot chamber 2 is supplied to the steering valve 9 via in order of the slit 13, the flow path 6, the variable orifice a, and the flow path 7, thereby providing with the prevention of seizure of the system, and disturbance such as kickback or the like, and the provision of the response.

FIG. 4 illustrates a driver 16 provided for driving the solenoid SOL and connected to the controller C and the solenoid SOL, throttles 17 and 18, and a relief valve 19.

The prior art power steering system as described above determines the solenoid current instruction value SI mainly with reference to the steering angle-based current instruction value I5 during high-speed travel and mainly with reference to the steering angular velocity-based current instruction value I6 during low-speed travel.

However, the solenoid current instruction value SI may be determined with reference to the steering angular velocity-based current instruction value I6 even during high-speed travel. In such a case, with regard to the stability and the safety, it is desired that the sensitivity is decreased with reducing the response of the current instruction value I6.

However, the prior art power steering system is incapable of slowing down the response of the current instruction value I6 because the steering angular velocity-based current instruction value I2 is not multiplied by the value of the gain in accordance with the vehicle speeds. Therefore, there is a problem that a driver feels uncomfortable during high-speed travel because the response is too high.

SUMMARY OF THE INVENTION

It is an object of the present invention to provide a power steering system which gives a driver no sense of discomfort during high-speed travel.

The power steering system according to the present invention includes a steering valve for controlling a power cylinder; a variable orifice provided upstream from the steering valve; a solenoid for controlling a degree of opening of the variable orifice; a controller for controlling a solenoid current instruction value SI used for driving the solenoid; a steering angle sensor and a vehicle speed sensor which are connected to the controller; and a flow control valve for distributing a flow supplied from a pump, to a control flow supplied to the steering valve in accordance with the degree of opening of the variable orifice, and a return flow circulating back to a tank or the pump.

A first feature of the present invention is that the controller: calculates or stores a current instruction value in accordance with a steering angle received from the steering angle sensor and a current instruction value in accordance with a steering angular velocity; multiplies each of the steering angle base current instruction value and the steering angular velocity base current instruction value by a current instruction value set on the basis of a vehicle speed; applies a current instruction value, according to the vehicle speed, serving as a limit value to each of the steering angle base and steering angular velocity base current instruction values obtained by the multiplication; selects a larger value out of the two current instruction values below these limit values; and determines the selected value as a solenoid current instruction value SI.

A second feature of the present invention is that the controller: calculates or stores a current instruction value in accordance with a steering angle received from the steering angle sensor and a current instruction value in accordance with a steering angular velocity; performs a multiplication of each of the steering angle base current instruction value and the steering angular velocity base current instruction value by a current instruction value set on the basis of a vehicle speed; selects a larger current instruction value out of the steering angle base and steering angular velocity base current instruction values obtained by the multiplication; applies a current instruction value, according to the vehicle speed, serving as a limit value to the selected larger current instruction value; and determines the value below the limit value as a solenoid current instruction value SI.

A third feature of the present invention is that the controller: calculates or stores a current instruction value in accordance with a steering angle received from the steering angle sensor and a current instruction value in accordance with a steering angular velocity; applies a current instruction value, according to a vehicle speed, serving as a limit value to each of the steering angle base current instruction value and the steering angular velocity base current instruction value; multiplies a larger current instruction value of the steering angle base and steering angular velocity base current instruction values below the limit values by a current instruction value set based on the vehicle speed; and determines a value resulting from the multiplication as a solenoid current instruction value SI.

A fourth feature of the present invention is that the controller: calculations or stores a current instruction value in accordance with a steering angle received from the steering angle sensor and a current instruction value in accordance with a steering angular velocity; selects a larger value out of the steering angle base and steering angular velocity base current instruction values; multiplies the selected current instruction value by a current instruction value set based on a vehicle speed; applies a current instruction value, according to the vehicle speed, serving as a limit value to the current instruction value obtained by the multiplication; and determines the value below the limit value as a solenoid current instruction values SI.

A fifth feature of the present invention is that the controller: calculates or stores a current instruction value in accordance with a steering angle received from the steering angle sensor and a current instruction value in accordance with a steering angular velocity; performs a multiplication of each of the steering angle base current instruction value and the steering angular velocity base current instruction value by a current instruction value set on the basis of a vehicle speed; applies a current instruction value, according to the vehicle speed, serving as a limit values to each of the steering angle base and steering angular velocity base current instruction values obtained by the multiplication; performs an addition of the steering angle base and steering angular velocity base current instruction values below the limit values to each other; and determines a result resulting from the addition as a solenoid current instruction values SI.

A sixth feature of the present invention is that the controller: calculates or stores a current instruction value in accordance with a steering angle received from the steering angle sensor and a current instruction value in accordance with a steering angular velocity; multiplies each of the steering angle base current instruction value and the steering angular velocity base current instruction values by a current instruction value set based on a vehicle speed; performs an addition of the steering angle base and steering angular velocity base current instruction values obtained by the multiplication, to each other; applies a current instruction value, according to the vehicle speed, serving as a limit value to the current instruction value obtained by the addition; and determines the value below the limit value as a solenoid current instruction value SI.

A seventh feature of the present invention is that the controller: calculates or stores a current instruction value in accordance with a steering angle received from the steering angle sensor and a current instruction value in accordance with a steering angular velocity; applies a current instruction value, according to a vehicle speeds, serving as a limit value to each of the steering angle base current instruction value and the steering angular velocity base current instruction value; performs an addition of the steering angle base and steering angular velocity base current instruction values below the limit values to each other; performs a multiplication of a value resulting from the addition by a current instruction value set based on the vehicle speed; and determines a value resulting from the multiplication as a solenoid current instruction value SI.

An eighth feature of the present invention is that the controller: calculates or stores a current instruction value in accordance with a steering angle received from the steering angle sensor and a current instruction value in accordance with a steering angular velocity; performs an addition of the steering angle base current instruction value to the steering angular velocity base current instruction value; performs a multiplication of a current instruction value obtained by the addition by a current instruction value set based on a vehicle speed; applies a current instruction value, according to the vehicle speed, serving as a limit value to a current instruction value obtained by the multiplication; and determines the value below the limit value as a solenoid current instruction value SI.

A ninth feature of the present invention is that, in the first to eighth features, the controller includes a standby control section for adding a standby current instruction value Is to the solenoid current instruction value SI, and performs a multiplication of the standby current instruction value Is by a current instruction value set on the basis of the vehicle speed.

A tenth feature of the present invention is that, in the first to eighth features, the controller includes a delay control section for lessening a rate of decrease when an incoming current instruction value is abruptly decreased, and outputting the resulting current instruction value.

According to the first to eighth features, a limit value is established after each of the steering angle base current instruction value and the steering angular velocity base current instruction value is multiplied by gain based on a vehicle speed. Therefore, even when the steering angular velocity base current instruction value serves as the reference during high-speed travel, slowed response of the steering angular velocity base current instruction value is provided effectively.

Hence, a driver is prevented from feeling uncomfortable by reducing the response moderately during high-speed travel.

According to the ninth feature, the standby flow is variable in accordance with the vehicle speed. This prevents a useless standby flow during high-speed travel.

According to the tenth feature, even if the incoming current instruction value is abruptly decreased, the rate of decrease is moderate, resulting in prevention of the discomfort conventionally caused by an abrupt decrease of the current instruction value.

DETAILED DESCRIPTION OF THE PREFERRED EMBODIMENTS

Figure 1:
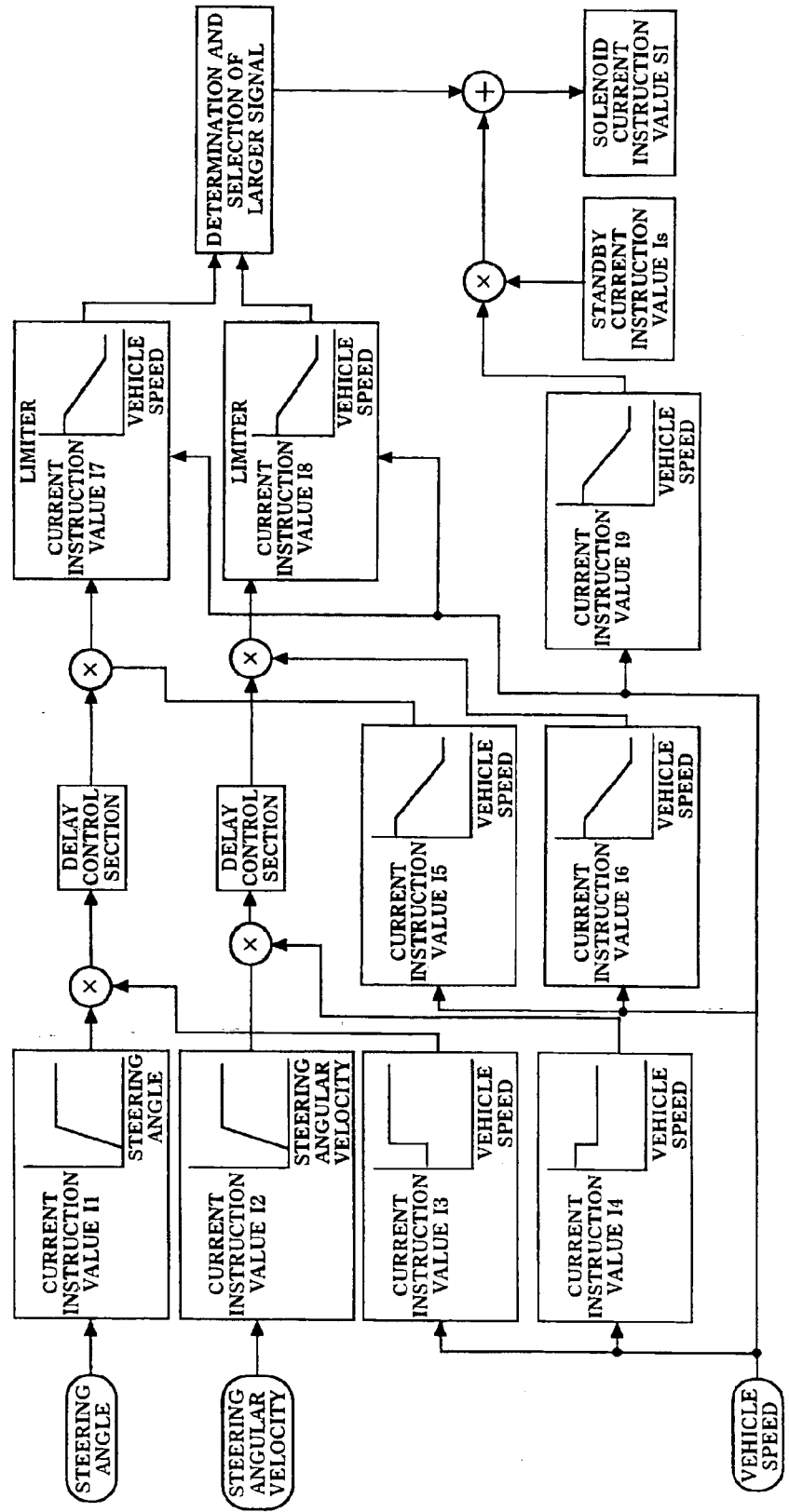
FIG. 1 is a diagram illustrating a control system of a controller C in a first embodiment.
Figure 4:
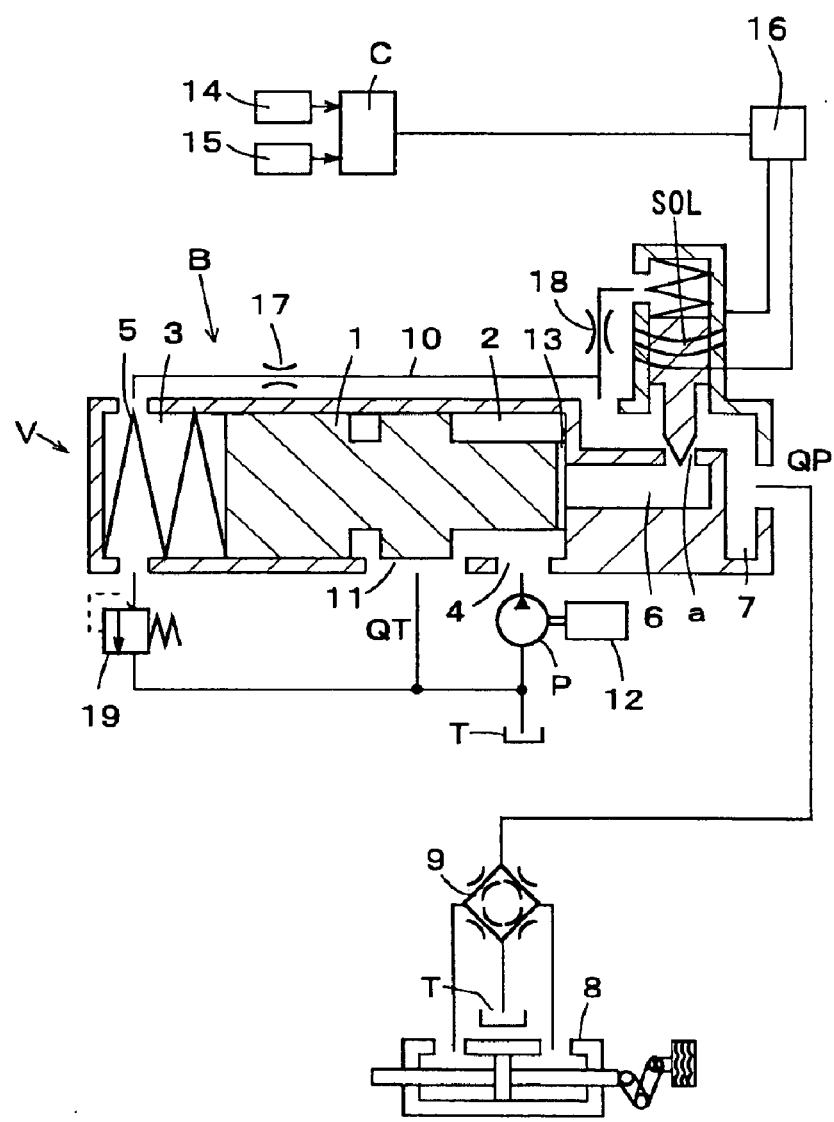
FIG. 4 is a general diagram of a power steering system in the prior art.
Figure 5:
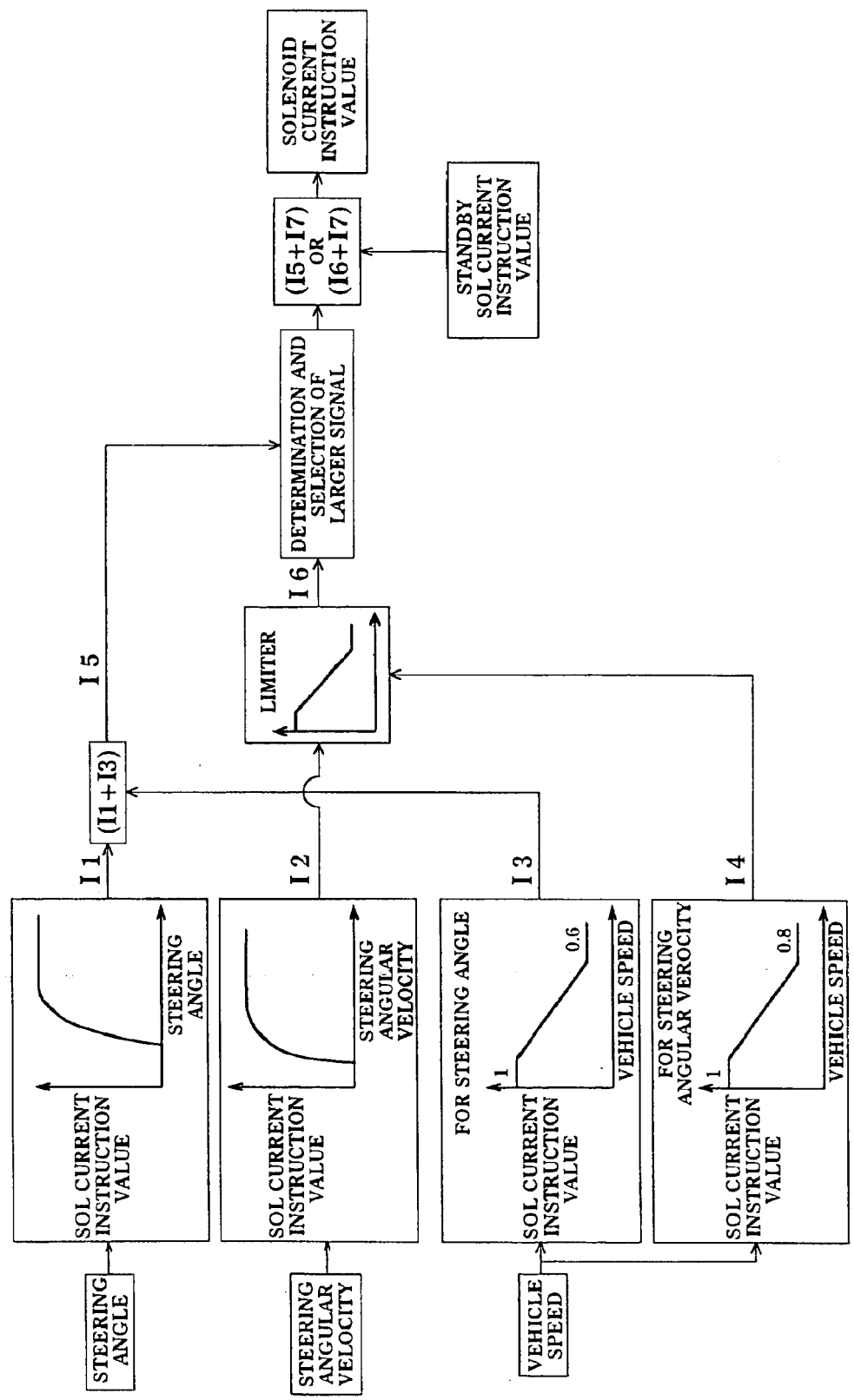
FIG. 5 is a diagram illustrating a control system of a controller C of the prior art.

FIG. 1 illustrates a control system of a controller C of a first embodiment according to the present invention. In the case of the first embodiment, the power steering system has the same configuration including the flow control valve V, the power cylinder 8, the steering valve 9 and so on illustrated in FIG. 4, exclusive of the controller C, as that of the prior art example which has been described earlier in FIG. 4, and the main description will now be given of the control system of the controller C.

As illustrated in FIG. 1, the controller C determines a current instruction value I1 based on a steering angle detected by the steering angle sensor 14 and a current instruction value I2 based on a steering angular velocity obtained by differentiation of the steering angle. However, it may be possible that a steering angular velocity sensor is additionally mounted and that the controller C determines the current instruction value I2 based on a steering angular velocity detected by the steering angular velocity sensor.

The relationship between the steering angle and the current instruction value I1 is determined on the basis of theoretical values giving linear characteristics to the relationship between the steering angle and the control flow QP. The relationship between the steering angular velocity and the current instruction value I2 is also determined on the basis of the theoretical values giving linear characteristics to the relationship between the steering angular velocity and the control flow QP.

The controller C outputs a current instruction value I3 for the steering angle and a velocity current instruction value I4 for the steering angular velocity based on a value detected by the vehicle speed sensor 15. The current instruction value I3 becomes smaller when the vehicle speed is at zero or in extremely slow speeds and the value I3 outputted is 1 when the vehicle speed is faster than a fixed speed. Further, the controller C outputs a value larger than 1 as the current instruction value I4 when the vehicle speed is at zero or in extremely slow speeds, and reduces the value to lower than 1 when the vehicle speed exceeds a fixed speed. The controller C multiplies the current instruction value I3 by the steering angle base current instruction value I1, and also the current instruction value I4 by the steering angular velocity base current instruction value I2.

The controller C multiplies the current instruction value I1 by the current instruction value I3 based on the vehicle speed in order to prevent energy loss when the vehicle stops or is driven at extremely low speeds with the steering wheel rotated. For example, when a vehicle is driven into a garage, it is sometimes parked with the steering wheel rotated and the engine running. Even in such a case, the current instruction value I1 in accordance with the steering angle is outputted as a solenoid current instruction value SI, so that an unnecessary oil flow is supplied to the steering valve 9. In order to prevent the energy loss in such a case, when the vehicle speed is at zero or in extremely slow speeds, the current instruction value I3 is multiplied to decreases the steering angle base current instruction value I1.

However, if the current instruction value I3 is smaller as described above, the response of the steering wheel becomes poorer when a driver starts turning the steering wheel held in an already-rotated position. For this reason, the controller C performs the multiplication of the steering angular velocity base current instruction value I2 by the current instruction value I4 allowing an output at a large value when the vehicle speed is zero or extremely low for ensuring the adequate response.

Figure 2:
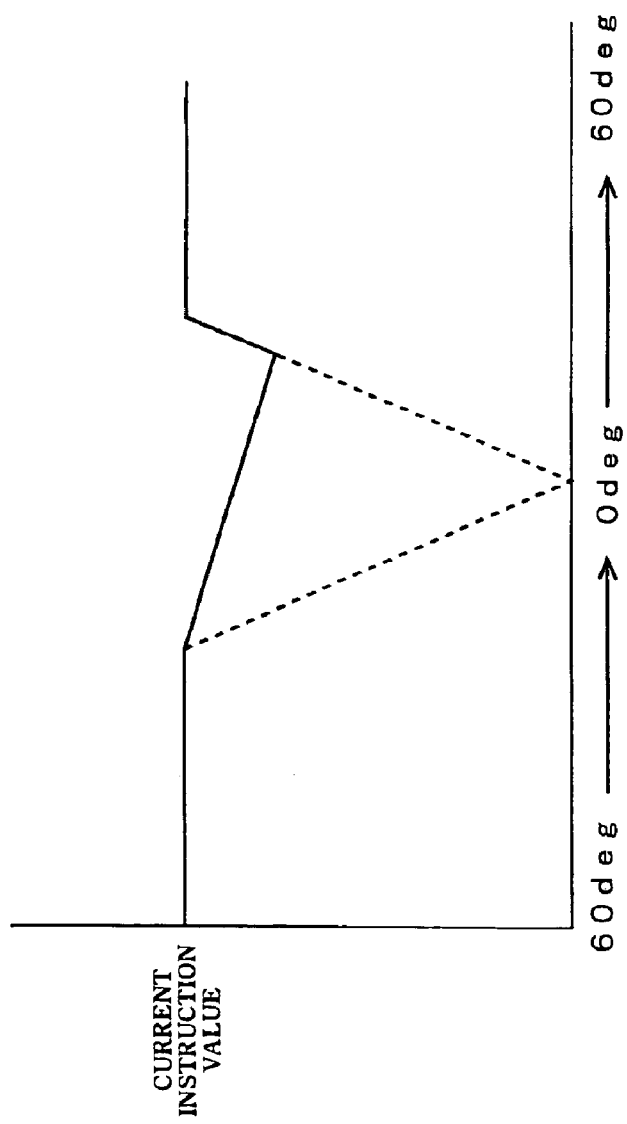
FIG. 2 is a chart showing characteristics of delay control.

After the current instruction values I1 and I2 are respectively multiplied by the current instruction values I3 and I4 based on the vehicle speed, a delay control section performs delay control on the values (I1×I3) and (I2×I4) obtained by the multiplication. The delay control is performed in order to slow the rate of decrease when an incoming current instruction value is abruptly decreased. For example, as illustrated in FIG. 2, when the steering wheel is rotated 60 degrees, then returned to the center position, and then rotated 60 degrees again, the steering angle base and steering angular velocity base current instruction values I1 and I2 temporarily drop to zero and then increase again. That is, the current instruction values I1 and I2 form a V line shown by the broken line in FIG. 2. When such a value as I1 or I2 is outputted as a solenoid current instruction value SI without change, the amount of oil flow supplied to the steering valve 9 changes abruptly. It is disadvantageous for a driver to feel uncomfortable with handling the steering wheel.

Hence, in order to solve such disadvantage, the delay control is carried out. Specifically, in the delay control section, when an inputted value is decreased abruptly, the delay control makes the decrease smaller for a gradual decrease in the current instruction value as shown by a solid line in FIG. 2. With this configuration, the current instruction value does not change abruptly when the steering wheel is around zero degree, resulting in giving no discomfort to a driver.

This delay control may be carried out at any stage before the controller C outputs a solenoid current instruction value SI.

The controller C multiplies the current instruction values after undergoing the delay control by the corresponding current instruction values I5, I6 both set based on the vehicle speed, in which these current instruction values I5, I6 are each outputted at one at low vehicle speeds, and at a value of decimal below 1 at highest vehicle speeds. Accordingly, the controller C outputs the inputted value directly at low vehicle speeds, whereas the outputted value becomes smaller and smaller as the vehicle speed increases. In other words, the controller C maintains the response to be high at low vehicle speeds and decreases the response at high vehicle speeds. The reason for the change of response in accordance with the vehicle speeds is that usually much of high response is not required during high-speed travel, whereas high response is required at low vehicle speeds in most cases.

The current instruction values after the multiplication are each outputted with reference to the corresponding current instruction values I7, I8 each set on the basis of the vehicle speed to serve as a limit value. In other words, if the resultant values of the multiplication exceed the corresponding current instruction values I7, I8 based on the vehicle speed at this point, the excessive amount is eliminated and the current instruction values below their limit values are each outputted. The reason for setting a limit value based on a vehicle speed is that an excessive assist force is prevented from being exerted during high-speed travel.

Although both of the current instruction values I7 and I8 are decreased in accordance with the vehicle speed, the gain is set to be smaller than that of the current instruction values I5, I6.

Next, the controller makes comparison between the steering angle base current instruction value and the steering angular velocity base current instruction value which are lessened below the limit values, and adopts a larger value of the two. Then the controller adds a standby current instruction value Is to the larger current instruction value. However, the standby current instruction value Is is not added directly, and it is multiplied by a current instruction value I9 set on the basis of a vehicle speed and the resultant value is added.

The reason that the standby current instruction value Is is multiplied by the current instruction value I9 based on the vehicle speed is the following.

As described earlier, the use of standby current instruction value Is has the three functions of preventing seizure in the system, ensuring response, and of countering disturbances, such as kickback and the like, and self-aligning torque. Among these, the response is especially necessary at low vehicle speeds and not so much necessary at high vehicle speeds. This is because if the response is too high during high-speed travel, handling the steering wheel becomes unsteady.

However, in the prior art, the standby current instruction value is fixed, so that the standby flow is set in accordance with the response at low vehicle speeds. Because of this, the standby flow is supplied more than necessary during high-speed travel, which caused energy loss by the energy consumed unnecessarily.

Therefore, in the first embodiment, in order to prevent such unnecessary loss of the standby flow, the current instruction value I9 based on the vehicle speed is multiplied by the standby current instruction value Is. The vehicle speed-based current instruction value I9 is outputted at 1 at low vehicle speeds, then gradually becomes smaller at medium vehicle speeds with an increase in vehicle speed, and then it maintains a minimum at high vehicle speeds.

Accordingly, the resultant value of the multiplication of the vehicle speed-based current instruction value I9 by the standby current instruction value Is is outputted directly at low vehicle speeds, then gradually becomes smaller at medium to high vehicle speeds, and then it maintains a minimum at high vehicle speeds. Thus, the standby flow loss caused at high vehicle speeds is prevented.

It should be noted that the standby current instruction value Is is set lest the resultant value of the multiplication of the current instruction value I9 by the current instruction value Is should become zero even at high vehicle speeds.

A section performing the addition of the standby current instruction value Is as described earlier corresponds to a standby control section of the present invention.

The controller C outputs a value resulting from the addition of the current instruction value (Is×I9) in the above way, to a driving unit 16 (see FIG. 4) as a solenoid current instruction value SI. Then, the driving unit 16 outputs an excitation current corresponding to the solenoid current instruction value SI to the solenoid SOL.

According to the first embodiment, after the steering angle base current instruction value I1 is multiplied by the current instruction value I5 based on the vehicle speed, the controller C calculates the current instruction value I7 serving a limit value based on the vehicle speed. After the steering angular velocity base current instruction value I2 is also multiplied by the current instruction value I6 based on the vehicle speed, the controller C calculates the current instruction value I8 serving a limit value based on the vehicle speed. That is to say, after the steering angle base and steering angular velocity base current instruction values are each multiplied by the corresponding gain based on the vehicle speed, the controller C further applies the limit values to them.

Hence, even when the steering angular velocity base current instruction value is selected as the reference in high-speed travel, the present invention allows a decrease in response of the steering angular velocity base current instruction value. Specifically, multiplying the current instruction value I6 based on the vehicle speed as the gain effectively decreases response.

According to the first embodiment, the response during high-speed travel is decreased appropriately to prevention of the driver from feeling uncomfortable.

In the first embodiment, the limiters applying the current instruction values I7, I8 as the limit values are individually provided immediately after the multiplication of the current instruction values I5, I6 serving as the gains. However, instead of the individual limiters, it may be possible to provide an across-the-board limiter for applying a vehicle speed-based current instruction value serving as a limit value to the resultant value of the addition of the standby current instruction value.

Further, in the first embodiment, the vehicle speed-based current instruction values I5, I6 are separately multiplied as the gain after the delay control is carried out. However, instead of the separate multiplication of the gain, a value selected in the value comparison may be multiplied by a vehicle speed-based current instruction value as the across-the-board gain.

Still further, an across-the-board limiter may be provided for applying a vehicle speed-based current instruction value serving as a limit value to a value resulting from the addition of the standby current instruction value, and also a value selected by the value comparison may be multiplied by a vehicle speed-based current instruction value as the across-the-board gain.

Figure 3:
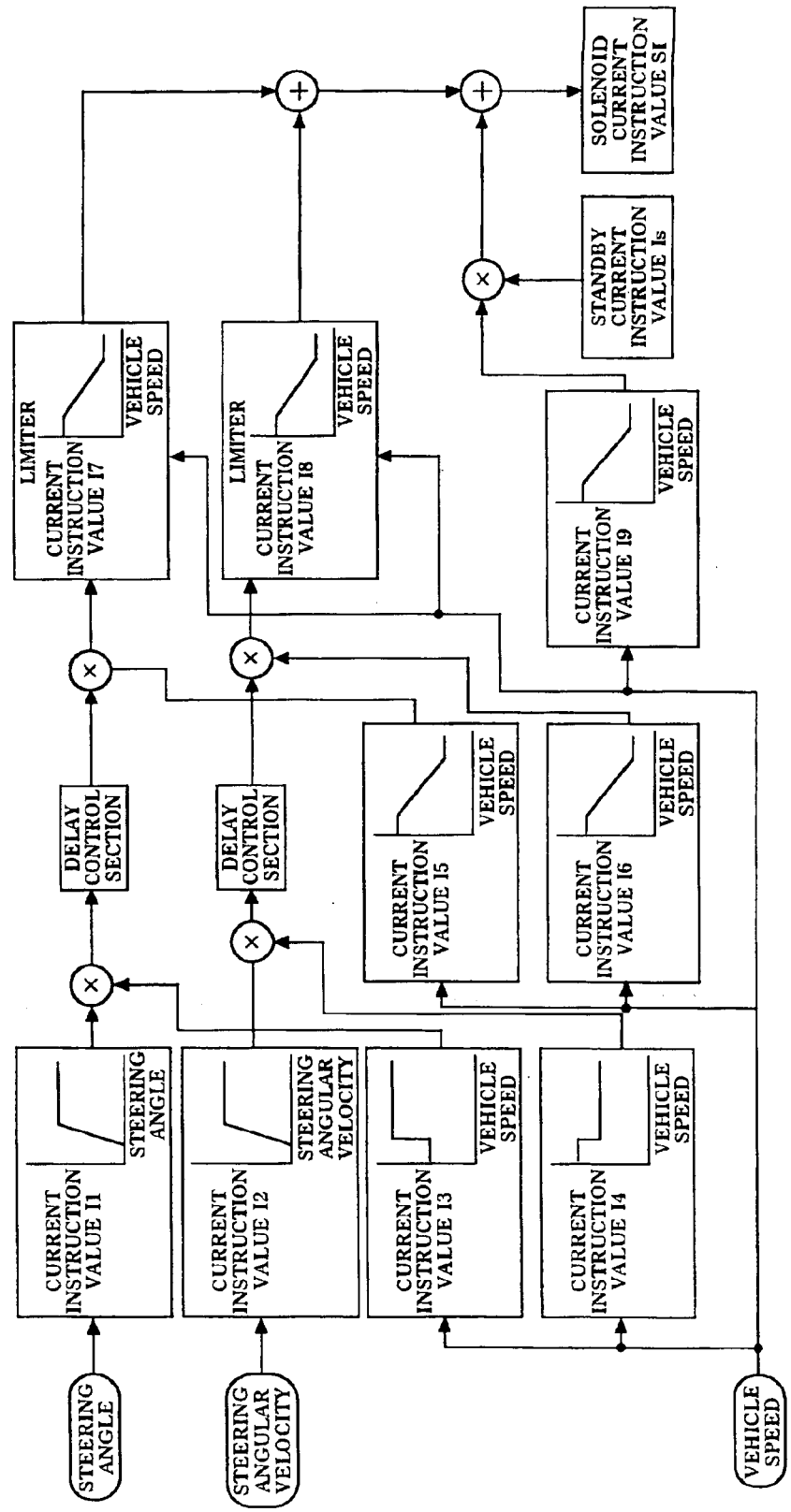
FIG. 3 is a diagram illustrating a control system of a controller C in a second embodiment.

FIG. 3 illustrates a second embodiment, in which instead of the determination of the magnitude between the steering angle base and the steering angular velocity base current instruction values in the first embodiment, these current instruction values are added to each other. The other configurations are the same as those in the first embodiment.

When the steering angle base current instruction value is added to the steering angular velocity base current instruction value as described above, it is possible to provide a solenoid current instruction value SI including both of the steering angle base characteristic and the steering angular velocity base characteristic.

In the second embodiment, after the steering angle base and the steering angular velocity base current instruction values are multiplied by the corresponding gains based on the vehicle speed, the limit values are determined in a similar way to the first embodiment. Therefore, it is possible to decrease the response for the steering angular velocity base current instruction value during high-speed travel even when the steering angular velocity base current instruction value becomes the reference.

Thus, response is appropriately decreased during high-speed travel to prevent the driver from feeling uncomfortable.

In the second embodiment, as in the case of the first embodiment, the limiters applying the current instruction values I7, I8 as the limit values are individually provided immediately after the multiplication of the current instruction values I5, I6 serving as the gains. However, instead of the individual limiters, it may be possible to provide an across-the-board limiter for applying a vehicle speed-based current instruction value serving as a limit value to the resultant value of the addition of the standby current instruction value.

Further, instead of the individual multiplication of the gain, a vehicle speed-based current instruction value may be used as across-the-board gain in the multiplication.

Still further, an across-the-board limiter may be provided for applying a vehicle speed-based current instruction value serving as a limit value to a value resulting from the addition of the standby current instruction value, and also a vehicle speed-based current instruction value may be used as across-the-board gain in the multiplication as described above.

I claim:

1. A power steering system, comprising:
    a steering valve (9) for controlling a power cylinder (8);
    a variable orifice (a) provided upstream from the steering valve (9);
    a solenoid (SOL) for controlling a degree of opening of the variable orifice (a);
    a controller (C) for controlling a solenoid current instruction value (SI) used for driving the solenoid (SOL);
    a steering angle sensor (14) and a vehicle speed sensor (15) which are connected to the controller (C); and
    a flow control valve (V) for distributing a flow supplied from a pump (P), to a control flow (QP) supplied to the steering valve (V) in accordance with the degree of opening of the variable orifice (a), and a return flow (QT) circulating back to a tank (T) or the pump (P),
    the controller (C) calculating or storing a current instruction value (I1) in accordance with a steering angle received from the steering angle sensor and a current instruction value (I2) in accordance with a steering angular velocity,
    multiplying each of the current instruction value (I1) based on the steering angle and the current instruction value (I2) based on the steering angular velocity by a current instruction value (I3, I4) set on the basis of a vehicle speed, applying a current instruction value (I7, I8), according to the vehicle speed, serving as a limit value to each of the current instruction value based on the steering angle and the current instruction value based on the steering angular velocity obtained by the multiplication, selecting a larger value out of the two current instruction values below these limit values, and determining the selected value as a solenoid current instruction value (SI).

2. A power steering system according claim 1, wherein the controller (C) comprises a standby control section for adding a standby current instruction value (Is) to the solenoid current instruction value (SI), and performs a multiplication of the standby current instruction value (Is) by a current instruction value (I9) set on the basis of the vehicle speed.

3. A power steering system, comprising:

a steering valve (9) for controlling a power cylinder (8);

a variable orifice (a) provided upstream from the steering valve (9);

a solenoid (SOL) for controlling a degree of opening of the variable orifice (a);

a controller (C) for controlling a solenoid current instruction value (SI) used for driving the solenoid (SOL);

a steering angle sensor (14) and a vehicle speed sensor (15) which are connected to the controller (C); and a flow control valve (V) for distributing a flow supplied from a pump (P), to a control flow (QP) supplied to the steering valve (V) in accordance with the degree of opening of the variable orifice (a), and a return flow (QT) circulating back to a tank (T) or the pump (P), the controller (C) calculating or storing a current instruction value (I1) in accordance with a steering angle received from the steering angle sensor and a current instruction value (I2) in accordance with a steering angular velocity, performing a multiplication of each of the current instruction value (I1) based on the steering angle and the current instruction value (I2) based on the steering angular velocity by a current instruction value (I3, I4) set on the basis of a vehicle speed, selecting a larger current instruction value out of the current instruction value based on the steering angle and the current instruction value based on the steering angular velocity obtained by the multiplication, applying a current instruction value, according to the vehicle speed, serving as a limit value to the selected larger current instruction value, and determining a value below the limit value as a solenoid current instruction value (SI).

4. A power steering system according claim 3, wherein the controller (C) comprises a standby control section for adding a standby current instruction value (Is) to the solenoid current instruction value (SI), and performs a multiplication of the standby current instruction value (Is) by a current instruction value (I9) set on the basis of the vehicle speed.

5. A power steering system, comprising:

a steering valve (9) for controlling a power cylinder (8);

a variable orifice (a) provided upstream from the steering valve (9);

a solenoid (SOL) for controlling a degree of opening of the variable orifice (a);

a controller (C) for controlling a solenoid current instruction value (SI) used for driving the solenoid (SOL);

a steering angle sensor (14) and a vehicle speed sensor (15) which are connected to the controller (C); and a flow control valve (V) for distributing a flow supplied from a pump (P), to a control flow (QP) supplied to the steering valve (V) in accordance with the degree of opening of the variable orifice (a), and a return flow (QT) circulating back to a tank (T) or the pump (P), the controller (C) calculating or storing a current instruction value (I1), in accordance with a steering angle received from the steering angle sensor and a current instruction value (I2) in accordance with a steering angular velocity, applying a current instruction value (I7, I8), according to a vehicle speed, serving as a limit value to each of the current instruction value (I1) based on the steering angle and the current instruction value (I2) based on the steering angular velocity, multiplying an instruction value, which is larger value between the current instruction value based on the steering angle and the current instruction value based on the steering angular velocity which are lessened below the current instruction value (I7, I8) which serve as limit values, by a current instruction value set based on the vehicle speed, and determining a value resulting from the multiplication as a solenoid current instruction value (SI).

6. A power steering system according claim 5, wherein the controller (C) comprises a standby control section for adding a standby current instruction value (Is) to the solenoid current instruction value (SI), and performs a multiplication of the standby current instruction value (Is) by a current instruction value (I9) set on the basis of the vehicle speed.

7. A power steering system, comprising:

a steering valve (9) for controlling a power cylinder (8);

a variable orifice (a) provided upstream from the steering valve (9);

a solenoid (SOL) for controlling a degree of opening of the variable orifice (a);

a controller (C) for controlling a solenoid current instruction value (SI) used for driving the solenoid (SOL);

a steering angle sensor (14) and a vehicle speed sensor (15) which are connected to the controller (C); and a flow control valve (V) for distributing a flow supplied from a pump (P), to a control flow (QP) supplied to the steering valve (V) in accordance with the degree of opening of the variable orifice (a), and a return flow (QT) circulating back to a tank (T) or the pump (P), the controller (C) calculating or storing a current instruction value (I1) in accordance with a steering angle received from the steering angle sensor and a current instruction value (I2) in accordance with a steering angular velocity, selecting a larger value out of the current instruction value (I1) based on the steering angle and the current instruction value (I2) based on the steering angular velocity, multiplying the selected current instruction value by a current instruction value set based on a vehicle speed, applying a current instruction value, according to the vehicle speed, serving as a limit value to the current instruction value obtained by the multiplication, and determining a value below the limit value as a solenoid current instruction values (SI).

8. A power steering system according claim 7, wherein the controller (C) comprises a standby control section for adding a standby current instruction value (Is) to the solenoid current instruction value (SI), and performs a multiplication of the standby current instruction value (Is) by a current instruction value (I9) set on the basis of the vehicle speed.

9. A power steering system, comprising:
a steering valve (9) for controlling a power cylinder (8);
a variable orifice (a) provided upstream from the steering valve (9);
a solenoid (SOL) for controlling a degree of opening of the variable orifice (a);
a controller (C) for controlling a solenoid current instruction value (SI) used for driving the solenoid (SOL);
a steering angle sensor (14) and a vehicle speed sensor (15) which are connected to the controller (C); and
a flow control valve (V) for distributing a flow supplied from a pump (P), to a control flow (QP) supplied to the steering valve (V) in accordance with the degree of opening of the variable orifice (a), and a return flow (QT) circulating back to a tank (T) or the pump (P),
the controller (C) calculating or storing a current instruction value (I1) in accordance with a steering angle received from the steering angle sensor and a current instruction value (I2) in accordance with a steering angular velocity,
performing a multiplication of each of the current instruction value (I1) based on the steering angle and the current instruction value (I2) based on the steering angular velocity by a current instruction value (I3, I4) set on the basis of a vehicle speed,
applying a current instruction value (I7, I8), according to the vehicle speed, serving as limit values to each of the current instruction value based on the steering angle and the current instruction value based on the steering angular velocity obtained by the multiplication,
performing an addition of the steering angle base and steering angular velocity base current instruction values which are below the limit values, and
determining a result resulting from the addition as a solenoid current instruction value (SI).

10. A power steering system according claim 9, wherein the controller (C) comprises a standby control section for adding a standby current instruction value (Is) to the solenoid current instruction value (SI), and performs a multiplication of the standby current instruction value (Is) by a current instruction value (I9) set on the basis of the vehicle speed.

11. A power steering system, comprising:
a steering valve (9) for controlling a power cylinder (8);
a variable orifice (a) provided upstream from the steering valve (9);
a solenoid (SOL) for controlling a degree of opening of the variable orifice (a);
a controller (C) for controlling a solenoid current instruction value (SI) used for driving the solenoid (SOL);
a steering angle sensor (14) and a vehicle speed sensor (15) which are connected to the controller (C); and
a flow control valve (V) for distributing a flow supplied from a pump (P), to a control flow (QP) supplied to the steering valve (V) in accordance with the degree of opening of the variable orifice (a), and a return flow (QT) circulating back to a tank (T) or the pump (P),
the controller (C) calculating or storing a current instruction value (I1) in accordance with a steering angle received from the steering angle sensor and a current instruction value (I2) in accordance with a steering angular velocity,
multiplying each of the current instruction value (I1) based on the steering angle and the current instruction values (I2) based on the steering angular velocity by a current instruction value (I3, I4) set based on a vehicle speed,
performing an addition of the current instruction value based on the steering angle and the current instruction value based on the steering angular velocity, obtained by the multiplication, to each other,
applying a current instruction value, according to the vehicle speed, serving as a limit value to the current instruction value obtained by the addition, and
determining a value below the limit value as a solenoid current instruction value (SI).

12. A power steering system according claim 11, wherein the controller (C) comprises a standby control section for adding a standby current instruction value (Is) to the solenoid current instruction value (SI), and performs a multiplication of the standby current instruction value (Is) by a current instruction value (I9) set on the basis of the vehicle speed.

13. A power steering system, comprising:
a steering valve (9) for controlling a power cylinder (8);
a variable orifice (a) provided upstream from the steering valve (9);
a solenoid (SOL) for controlling a degree of opening of the variable orifice (a);
a controller (C) for controlling a solenoid current instruction value (SI) used for driving the solenoid (SOL);
a steering angle sensor (14) and a vehicle speed sensor (15) which are connected to the controller (C); and
a flow control valve (V) for distributing a flow supplied from a pump (P), to a control flow (QP) supplied to the steering valve (V) in accordance with the degree of opening of the variable orifice (a), and a return flow (QT) circulating back to a tank (T) or the pump (P),
the controller (C) calculating or storing a current instruction value (I1) in accordance with a steering angle received from the steering angle sensor and a current instruction value (I2) in accordance with a steering angular velocity,
applying a current instruction value (I7, I8), according to a vehicle speeds, serving as a limit value to each of the current instruction value (I1) based on the steering angle and the current instruction value (I2) based on the steering angular velocity,
performing an addition of the current instruction value based on the steering angle and the current instruction value based on the steering angular velocity which are below the limit values,
multiplying a value resulting from the addition by a current instruction value set based on the vehicle speed, and
determining a value resulting from the multiplication as a solenoid current instruction value (SI).

14. A power steering system according claim 13, wherein the controller (C) comprises a standby control section for adding a standby current instruction value (Is) to the solenoid current instruction value (SI), and performs a multiplication of the standby current instruction value (Is) by a current instruction value (I9) set on the basis of the vehicle speed.

15. A power steering system, comprising:

a steering valve (9) for controlling a power cylinder (8);

a variable orifice (a) provided upstream from the steering valve (9);

a solenoid (SOL) for controlling a degree of opening of the variable orifice (a);

a controller (C) for controlling a solenoid current instruction value (SI) used for driving the solenoid (SOL);

a steering angle sensor (14) and a vehicle speed sensor (15) which are connected to the controller (C); and a flow control valve (V) for distributing a flow supplied from a pump (P), to a control flow (QP) supplied to the steering valve (V) in accordance with the degree of opening of the variable orifice (a), and a return flow (QT) circulating back to a tank (T) or the pump (P), the controller (C) calculating or storing a current instruction value (I1) in accordance with a steering angle received from the steering angle sensor and a current instruction value (I2) in accordance with a steering angular velocity, adding the current instruction value (I1) based on the steering angle to the current instruction value (I2) based on the steering angular velocity, performing a multiplication of a current instruction value obtained by the addition by a current instruction value set based on a vehicle speed, applying a current instruction value, according to the vehicle speed, serving as a limit value to a current instruction value obtained by the multiplication, and determining a value below the limit value as a solenoid current instruction value (SI).

16. A power steering system according claim 15, wherein the controller (C) comprises a standby control section for adding a standby current instruction value (Is) to the solenoid current instruction value (SI), and performs a multiplication of the standby current instruction value (Is) by a current instruction value (I9) set on the basis of the vehicle speed.

* * * * *

UNITED STATES PATENT AND TRADEMARK OFFICE
CERTIFICATE OF CORRECTION

PATENT NO. : 6,843,342 B2  Page 1 of 1
DATED : January 18, 2005
INVENTOR(S) : Noboru Shimizu et al.

It is certified that error appears in the above-identified patent and that said Letters Patent is hereby corrected as shown below:

Title page,
Item [75], Inventor, the first name of the second inventor should be -- Tsunefumi Arita --.

Signed and Sealed this

Nineteenth Day of April, 2005

JON W. DUDAS
*Director of the United States Patent and Trademark Office*